United States Patent
Greth et al.

(10) Patent No.: US 11,722,438 B2
(45) Date of Patent: Aug. 8, 2023

(54) MAINTAINING BANDWIDTH UTILIZATION IN THE PRESENCE OF PACKET DROPS

(71) Applicant: Intel Corporation, Santa Clara, CA (US)

(72) Inventors: John Greth, Hudson, MA (US); Arvind Srinivasan, San Jose, CA (US); Robert Southworth, Chatsworth, CA (US); David Arditti Ilitzky, Zapopan (MX); Bongjin Jung, Westford, MA (US); Gaspar Mora Porta, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 749 days.

(21) Appl. No.: 16/546,993

(22) Filed: Aug. 21, 2019

(65) Prior Publication Data

US 2021/0058343 A1 Feb. 25, 2021

(51) Int. Cl.
*H04L 49/00* (2022.01)
*H04L 49/25* (2022.01)
*H04L 9/40* (2022.01)
*H04L 69/22* (2022.01)
*H04L 41/0896* (2022.01)
*H04L 49/90* (2022.01)

(52) U.S. Cl.
CPC ...... *H04L 49/3045* (2013.01); *H04L 41/0896* (2013.01); *H04L 49/257* (2013.01); *H04L 49/9042* (2013.01); *H04L 63/101* (2013.01); *H04L 69/22* (2013.01)

(58) Field of Classification Search
CPC ............ H04L 49/3045; H04L 41/0896; H04L 49/257; H04L 49/9042; H04L 63/101; H04L 69/22
See application file for complete search history.

(56) References Cited

U.S. PATENT DOCUMENTS

| | | | | |
|---|---|---|---|---|
| 2007/0223483 A1* | 9/2007 | Huang | .................... | H04L 47/35 370/474 |
| 2012/0011351 A1* | 1/2012 | Mundra | ................ | H04L 9/3242 713/192 |
| 2015/0249620 A1* | 9/2015 | Folsom | .................... | G06F 13/42 370/392 |

(Continued)

OTHER PUBLICATIONS

OpenFlow, "OpenFlow Switch Specification" Version 1.3.1 (Wire Protocol 0x04), Open Networking Foundation, Sep. 6, 2012, 128 pages.

(Continued)

*Primary Examiner* — Basil Ma
(74) *Attorney, Agent, or Firm* — Compass IP Law PC (57) ABSTRACT

Examples describe a manner of scheduling packet segment fetches at a rate that is based on one or more of: a packet drop indication, packet drop rate, incast level, operation of queues in SAF or VCT mode, or fabric congestion level. Headers of packets can be fetched faster than payload or body portions of packets and processed prior to queueing of all body portions. In the event a header is identified as droppable, fetching of the associated body portions can be halted and any body portion that is queued can be discarded. Fetch overspeed can be applied for packet headers or body portions associated with packet headers that are approved for egress.

20 Claims, 6 Drawing Sheets

(56) References Cited

U.S. PATENT DOCUMENTS

2020/0136986 A1* 4/2020 Southworth .......... H04L 49/901
2020/0412659 A1* 12/2020 Arditti Ilitzky ....... H04L 43/087

OTHER PUBLICATIONS

The P4 Language Consortium, "The P4 Language Specification", Version 1.0.5, Nov. 26, 2018, 96 pages.
Tracey Wilson, "Control List (ACL) Concepts", Access Control List (ACL) in Networking, Pluralsight, https://www.pluralsight.com/blog/it-ops/access-control-list-concepts, May 16, 2012, 10 pages.

* cited by examiner

MAINTAINING BANDWIDTH UTILIZATION IN THE PRESENCE OF PACKET DROPS

TECHNICAL FIELD

Various examples described herein relate to managing congestion in a switch.

BACKGROUND

In the field of data communications, switches are used to receive packets at one or more ingress ports and forward packets, through the switch fabric, to the target egress port for transmission to an intermediate node or endpoint destination receiver. In switches, an egress pipeline may make a determination of which packets to permit to egress from an egress port and which packets to drop. This determination is based on the header and metadata of the packet. However, bandwidth for fetching packet segments from the switch fabric into the egress port is limited and is essentially wasted whenever a packet is dropped. Bandwidth for fetching packet segments from a switch is wasted because the data is fetched but not egressed on the wire (e.g., network medium). This can result in loss of bandwidth utilization on the wire (so called "bubbles") arising from gaps between packets egressed on a wire even if there are packets ready to be fetched and egressed.

DETAILED DESCRIPTION

A switch fabric typically uses an egress-access control list (E-ACL) operation and other types of schemes to determine whether to egress or drop a packet that is fetched from the switch fabric. For example, in some cases, approximately 10% of traffic fetched from the switch fabric can be dropped due to E-ACL. Any dropped packet can reduce the bandwidth observed on an output (egress) port as there may be gaps between egressing of packets. This is an unfortunate loss in case of an incast scenario. An incast scenario is where the output port bandwidth is overallocated by the packets from one or multiple input ports, i.e. there is not enough bandwidth in the output port to service all the traffic that must be forwarded to it, thus causing a bottleneck inside the switch.

In some known solutions, E-ACL drop conditions can be checked at ingress before packets are provided to the switch fabric so that packets are not fetched from the switch fabric and gaps at egress from packet drops generated by E-ACL are avoided. However, the drop conditions are set per output port. Applying checks at ingress means that each ingress port must know the policy for each egress port, which is not a scalable solution for use with increasing numbers of egress or ingress ports.

In some cases, packets selected for dropping can block other packets from utilizing switch fabric fetch bandwidth and output port bandwidth as the packets that were fetched but dropped an already-consumed part of the limited fetch bandwidth and has occupied a part of the limited queue space that would otherwise be available for other packets that would not be dropped but egressed.

At least in the case of incast, various embodiments attempt to reduce a duration of a gap or bubble (e.g., non-transmission of any packet) between egressed packets even despite dropping of multiple consecutive packets. Various embodiments provide for fetching headers faster than payloads and performing header processing to determine if a packet is to be dropped. Various embodiments provide for fetching multiple packets concurrently (e.g., fetching parts of distinct packets in an interleaved way, so that the complete packets are fetched concurrently), utilizing the excess fetch bandwidth but potentially fetching each of the concurrent packets at slower than port rate speed. If header processing reveals a packet is to be dropped, fetches of the remaining body segments for the dropped packet can be halted and fetched body segments can be de-allocated from a queue and made available for uses by other packets. Various embodiments fetch packets faster than line rate from a switch fabric so that there will be extra packets ready to send following a packet drop. Fetch bandwidth (including excess fetch bandwidth) is limited, so several schemes can be used to increase the impact of use of excess fetch bandwidth or reduce the consumed fetch bandwidth. Reducing consumed fetch bandwidth can help avoid congestion at the switch fabric, which may affect bandwidth and latency for all egress ports on the switch. Various embodiments provide drop rate based adaptation of fetch overspeed allocation with prompt output queue buffer deallocation for dropped packets.

Figure 1:
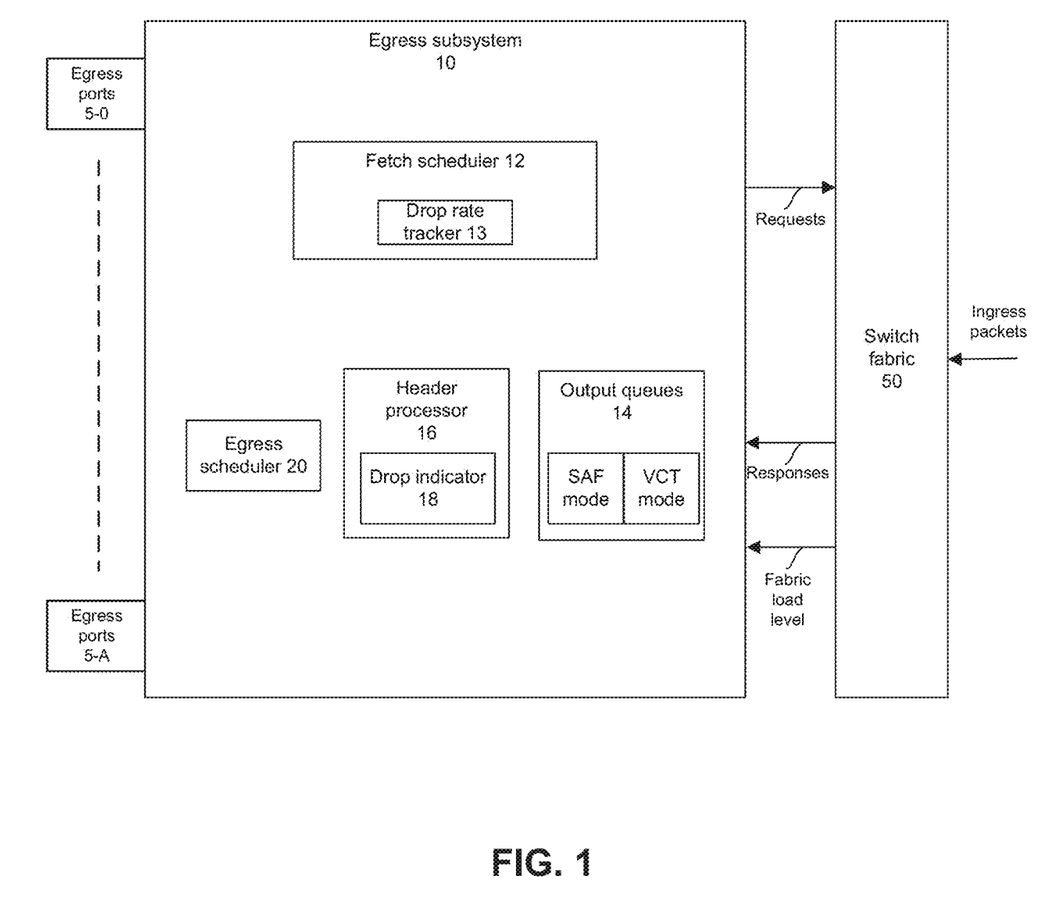
FIG. 1 depicts an example system that can be used to manage fetch rate and use of output butters for an egress system.

FIG. 1 depicts an example system that can be used to manage packet segment fetch rate and use of output buffers for an egress system. Fetch scheduler 12 decides what packet segments to fetch from switch fabric 50 and issues requests to switch fabric 50 for packet segments. Responses from switch fabric 50 are received at egress subsystem 10 and stored in reorder output queues 14. Reorder output queues 14 can include one or more queues. Fetch scheduler 12 can only issue a packet segment requests to switch fabric 50 if there is at least one entry available is the destination queue in output queues 14. Header processor 16 can process one or more packets headers from queues 14. Based on an applicable E-ACL, or any other egress packet processing policy, that may result in packet drops for an egress port or groups of egress ports, processing one or more headers may lead to a decision to drop a packet. For example, a packet can be dropped because of security violations, other reasons such as overflow, or any reason. Packets can be egressed from one or more of egress ports 5-0 to 5-A, where A≥1. Note that egress subsystem 10 can use a single egress port 5-0 instead of multiple egress ports to egress packets.

Fetch scheduler 12 can cause header fetching and processing headers from queue 14 before fetching an entire body from queue 14 or, in some cases, switch fabric 50. Fetch scheduler 12 can issue requests for header segments of a packet using overspeed but time division multiplex requests for packet body segments to stretch out the time the packet body is fetched. Fetch scheduler 12 can fetch multiple packets by sending multiple requests in parallel via multiple interfaces to switch fabric to fetch a first segment (flit) of a first packet (only part of a full packet), a second flit of the first packet (only part of a full packet), etcetera, then fetch a flit of second packet (only part of a full packet), second flit of the second packet (only part of a full packet), etcetera. This increases the number of requests that can be skipped if there is a drop of a packet decided based on header processing. It also increases the probability that there will be additional packets ready to be sent from output queue 14 immediately in case a packet is dropped.

Fetching multiple packets "concurrently" can occur, by fetching their segments in an interleaved fashion request header of packet 1, then header of packet 2, then header of packet 3, and afterward start fetching body segments of those packets that were not identified as being dropped.

When multiple packets, all destined to the same egress port, are being fetched in parallel or concurrently (interleaved), such packets can be fetched at lower than port rate speed (depending on the amount of packets being simultaneously fetched, and the available switch fabric overspeed).

Time division multiplexing requests for body segments (e.g., parallel/concurrent multiplexed packet fetching) can be turned off or on based on the observed drop rate. If the observed drop rate is higher, multiplexing can be turned on or if the observed drop rate is lower, multiplexing can be turned off.

To prevent underruns when fetching multiple packets simultaneously, fetch scheduler 12 may cause output queue 14 to operate in store and forward (SAF) mode. For SAF mode, the egress subsystem 10 is configured to fetch the complete packet from switch fabric 50 into output queue 14 before the packet is eligible to start transmission. This allows packets to be fetched at lower-than-line-rate speed (underspeed). This operation can provide a trade-off between latency (which is already not optimal because of incast) for packet diversity in the egress pipeline. However, if processing of a header reveals that the packet is to be dropped, fetching of body segments can be halted or discarded.

In some embodiments, fetch scheduler 12 fetches a batch of headers but waits for a header to be approved (permitted to egress) before fetching payloads to avoid wasting fetch bandwidth for a packet payload that is to be dropped. Entire headers that arrive in output queue 14 are immediately sent to header processor 16 to determine if the packet will be dropped or egressed. This way, header processing can complete before the body is fetched. Header processor 16 can indicate that a packet header (and its payload) is to be dropped using drop indicator 18. When a packet is dropped, fetch scheduler 12 is notified immediately so that any remaining portion of the packet will not be fetched or in-flight fetches can be aborted. If only a packet header is fetched before fetching a body portion, output queue 14 can operate in store-and-forward (SAF) mode. If a packet is to be egressed, body segments can be fetched using overspeed sequentially and permitted to operate in virtual cut-through (VCT) mode to permit egress of packets that are not completely received in queue 14.

Fetch scheduler 12 assigns a packet-ID to each packet and receives feedback on which packets are selected for dropping by receiving a drop indication from drop indicator 18 referencing their associated packet-IDs. In some cases, fetch scheduler 12 can abort fetching the remainder of a packet that is designated for dropping by header processor 16. Output queue 14 is configured to immediately drop all the previously received segments associated with a packet selected for dropping by receiving a drop indication from drop indicator 18 referencing the packet-ID associated to the packet being dropped. The egress subsystem 10 can be configured to drop in-flight packet segments (corresponding to in-flight requests or responses in switch fabric 50) associated with packets selected for dropping either before or after such segments are stored in output queue 14.

When the egress subsystem 10 is configured to drop packet segments after the segments are stored in the output queue 14, called the "late dropping" configuration, the output queue 14 is configured to store each received packet segment on its allocated entry and, if the segment is associated with a packet being dropped, to drop it and deallocate its associated entry immediate after the received segment is stored. When the egress subsystem 10 is configured to drop packet segments before the segments are stored in the output queue 14, called the "early dropping" configuration, the output queue 14 is configured to immediately, after receiving the drop indication from drop indicator 18, free up the entries that were previously allocated for the packet being dropped (e.g., entries being freed up faster than the rate at which entries are allocated for new packets) and to drop any outstanding responses associated with the packet being dropped as soon as the responses are received from the switch fabric 50. The "early dropping" configuration allows output queue 14 to have more unallocated spaces instead of spaces being used and then deallocated, and therefore the output queue 14 can be shallower. Moreover, in the "early dropping" configuration, the next-in-line packet (inside output queue 14) may be available for egress immediately after the head-of-line (inside output queue 14) packet drop indication is received from drop indicator 18.

After a drop indication from drop indicator 18, output queues 14 allow deallocation rate (for dropped packets) to at least equal the line rate. In the "late dropping" configuration, dropped packet deallocation may temporarily stall while waiting for inflight requests for the dropped packet to land in output queue 14. In the "early dropping" configuration, dropped packet deallocation should be immediate and never stall.

After a packet is dropped, fetch scheduler 12 can fetch one or more subsequent packets from switch fabric 50 with overspeed as long as there are entries available for allocation in the destination output queue 14. Fetch scheduler 12 will never fetch a packet segment unless there is at least one output queue segment credit (i.e. an output queue entry available for allocation) for the destination output queue, in which case such a credit (output queue entry) is allocated to the packet segment about to be fetched. Fetch scheduler 12 may start fetching the next-in-line packet from switch 50 right after a drop indication.

Upon receiving a drop indication from drop indicator 18, fetch scheduler 12 can re-allocate fetch bandwidth originally allocated to the dropped packet, to one or multiple of the non-dropped packets that are simultaneously being fetched. In some embodiments, overspeed amounts can be shared across egress ports. If drops are concentrated on one egress port, the remaining ports will have full output queues without using any overspeed, so all the overspeed available for a group of ports can be used for one or more egress ports that need it.

Fetch scheduler 12 can keep track of the drop rate (e.g., E-ACL and/or other reasons) in drop rate tracker 13. As E-ACL drop rate increases, fetch scheduler 12 will adapt the utilization of switch fabric 50 overspeed such that when most of the outstanding traffic corresponds to a single queue within output queues 14, fetch scheduler 12 fetches all packets for this queue with overspeed. But when traffic is distributed across queues within output queues 14, fetch scheduler 12 fetches multiple packets (for distinct queues) simultaneously using overspeed. Selective use of overspeed when a drop rate increases can attempt to fill output queue 14 so that packets are available for egress from output queue 14. Switch fabric 50 can provide overspeed compared to the output port line rate from any egress port. Overspeed allows fetching packets from switch fabric 50 into output queue 14 faster than packets can be egressed from an egress port.

For example, in a case where incast exists, E-ACL drop rate is relatively high, and output queue 14 is configured in store-and-forward (SAF) mode, multiple packets can be fetched from switch fabric 50 at lower than egress port speed. Multiple headers can be ready for processing by header processor 16, which can minimize the bandwidth wasted in fetching bodies for packets that will be dropped.

Fetch scheduler 12 can adjust fetch speed from switch fabric 50 to less than or more than egress line rate based on one or more of: a drop indication, drop rate, incast level, operation of queues in SAF or VCT mode, or fabric congestion (or load) level. Fetch scheduler 12 may use drop indicator 18, drop rate tracker 13 and a fabric load level indication signal to adapt how much of the switch fabric 50 overspeed to exercise at any given time, to prevent fabric saturation and to reduce gaps between egressed packets.

Based on fabric load level indication signal from switch fabric 50, fetch scheduler 12 can throttle fetch request rate (fetch bandwidth) (and not just by availability of entries in output queue 14). The fetch bandwidth throttling can be used for switch fabric congestion avoidance or stabilization (when congestion has already occurred).

When fetching multiple packets in a batch from a switch fabric with unpredictable latency and out-of-order responses, fetch scheduler 12 can set a jitter threshold for output queue 14 to avoid underrun (prevent egress of packet before a time or size threshold is met). Overspeed can be used to fetch a jitter threshold worth of each packet at faster than line-rate speed, thus minimizing the exposed latency for packets. In some examples, overspeed can be used to fetch more than one packet (destined to distinct output queues) simultaneously. A batch can be any of: multiple packets, back to back, in sequence; multiple packets concurrently, by interleaving them through the same interface to switch fabric; or multiple packets in parallel, by fetching them through distinct interfaces to switch fabric.

At most [OVERSPEED] virtual cut-through (VCT) packets can be fetched simultaneously, where OVERSPEED represents the switch fabric overspeed coefficient. Because VCT packets may not always be fetched with overspeed (i.e., if the packet reception in switch 50 is not yet completed), the spare overspeed can be used to fetch SAF packets at sub line-rate. OVERSPEED=1.0 means there is no excess bandwidth, i.e. fabric speed is equal to port speed. OVERSPEED=1.5 means the fabric speed is 1.5× the speed of the port, thus the fabric has 50% of excess bandwidth. OVERSPEED=2.0 means the fabric speed is 2× the speed of the port, thus there is 100% of excess bandwidth.

A queue within output queues 14 configured to operate in store-and-forward (SAF) mode, holding at least a packet's header segments, at or after a determination that such packet is not to be dropped may start operating in virtual cut-through (VCT) mode only if the fetch scheduler 12 allocates to the reminder of such packet a fetch bandwidth equal to or larger than the output port rate. Packets allocated to an output queue 14 configured to operate in VCT mode can be fetched at egress rate and the remaining available over-speed bandwidth is used to fetch other packets allocated to output queue 14 configured to operate in SAF mode.

When incast exists for an output port through which a flow of latency sensitive packets are assigned to be egressed, and the egress packet drop rate is relatively high (above a threshold level), latency can be reduced for this flow by forcing VCT mode on all packets associated with the flow, only when the flow is expected to experience low or insignificant packet drop rates this forced VCT mode operation is used for latency sensitive flows that are not guaranteed to experience low drop rates, this operation can reduce the experienced latency of the flow in exchange for a probabilistic decrease of output port bandwidth utilization (which depends on the drop rate of the flow).

In some examples, when all packets correspond to SAF mode, then packets are fetched at greater-than or equal-to egress port speed and in sequence, instead of being fetched in TDM fashion. In this case, there is no incast or there is incast but the currently detected E-ACL drop rate is extremely low such that E-ACL based gaps in egress are not a concern.

Figure 2:
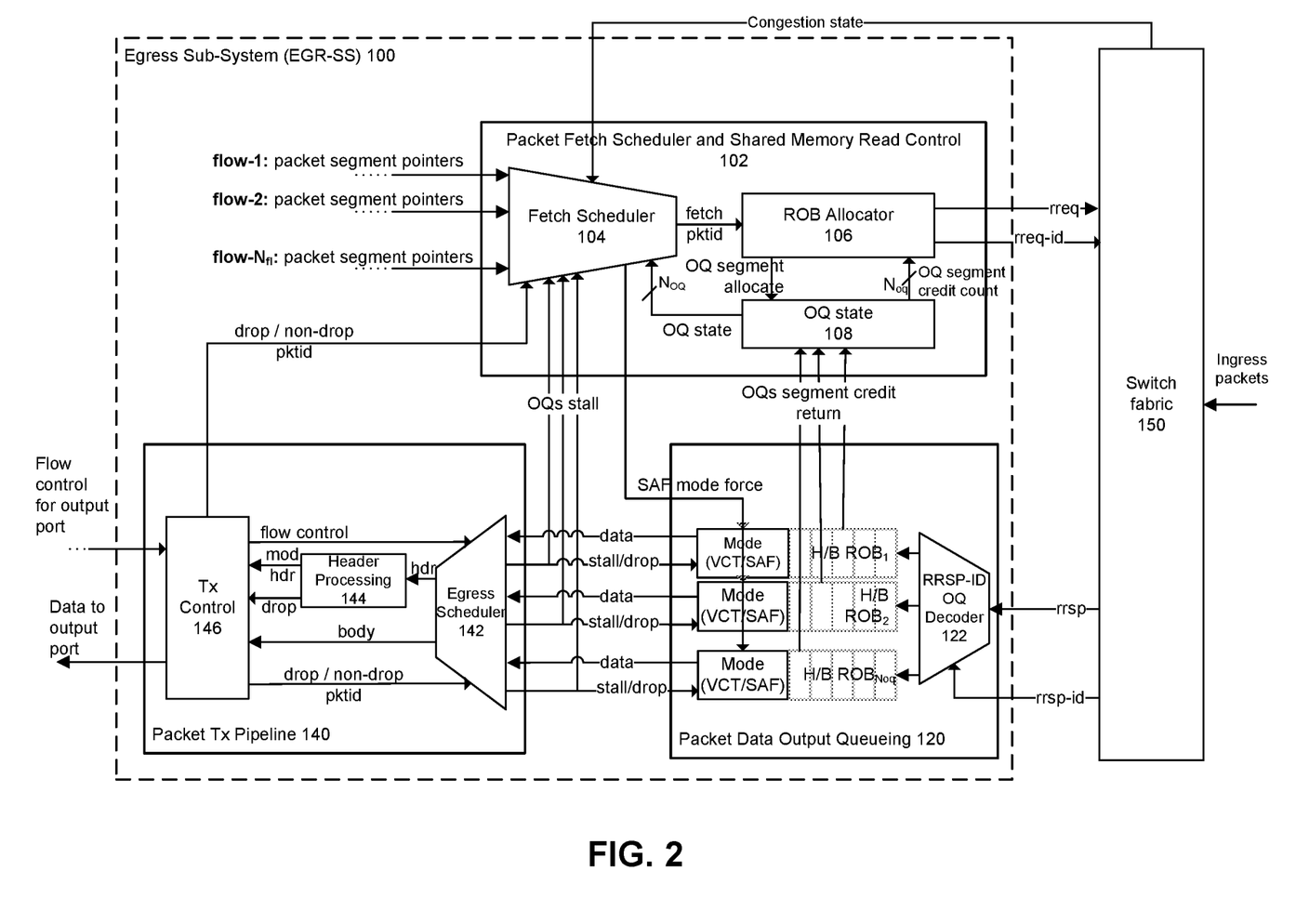
FIG. 2 depicts an egress sub-system.

FIG. 2 depicts an egress sub-system. An egress subsystem 100 can support egress of packets for a single output port or can be scaled to support egress of packets from multiple ports or multi-configuration port tiles (e.g., 1×400 GE, 2×200 GE, 4×100 GE, or other configurations). Egress subsystem 100 can request packet segments from fabric 150. For example, fabric 150 can provide a fully-connected multi-hop topologies that results in unpredictable latencies and out-of-order data delivery. Examples of such topologies are: torus, butterflies, buffered multi-stage, etc. An example of switch fabric 150 is a shared memory switch fabric (SMSF), although other switch fabrics can be used. Some embodiments can use a fully-connected multi-hop switch fabric 150 implemented as a Shared Memory Switch Fabric (SMSF), e.g. a shared memory mesh, yet the embodiments apply independent of the chosen fabric. Switch fabric interface bandwidth is assumed to be at least the output port line rate and excess bandwidth is referred to as overspeed.

Switch fabric 150 can include a memory buffer used to connect ingress ports to egress ports. Switch fabric 150 can connect ingress ports to egress ports but provide unpredictable delay from the time that the egress subsystem requests a packet segment fetch to the arrival time of the requested packet segment at the egress subsystem.

Switch fabric 150 can receive packets using ingress ports. Ingress ports can receive packets from a network medium compliant with any standard, including Ethernet, transmission control protocol (TCP), User Datagram Protocol (UDP), FibreChannel, InfiniBand, OmniPath, Intel Quick-Path interconnect (QPI), Intel Ultra Path interconnect (UPI), Intel On-Chip System Fabric (IOSF), InfiniBand, Compute Express Link (CXL), HyperTransport, high-speed fabric, PCIe, NVLink, Advanced Microcontroller Bus Architecture (AMBA) interconnect, OpenCAPI, Gen-Z, CCIX, NVMe over Fabrics (NVMe-oF) (described at least in NVM Express Base Specification Revision 1.4 (2019)), and variations thereof, and so forth.

Referring next to packet fetch scheduler and shared memory read controller (PFSSMRC) component 102. PFSSMRC 102 receives per-flow delivery at least of packet segment pointers or handles from the ingress subsystems of switch 150. Each of flow-A, where A ranges between 1 (i.e. flow-1) and $N_{fl}$ (i.e. flow-$N_{fl}$), represent a sequence of packet segment pointers, for packets corresponding to flow A, to be fetched from the switch fabric 150 by the egress sub-system 100 for transmission through the associated egress port to a network medium. In some embodiments $N_{fl}$ can represent the maximum number of flows segregated at the egress sub-system 100. In some embodiments $N_{fl}$ can be matched to $N_{OQ}$ which represents the number of output queues per output port. For types of fabrics other than SMSF, OQ-1 to OQ-$N_{fl}$ represent packet segment handles, which refer to a packet segment as required by the specific fabric.

Fetch scheduler 104 decides which flow and corresponding packets to fetch from fabric 150 and allocates space for the fetched data in re-order buffers (ROBs). At least one ROB exist per output queue associated with an output port, i.e. at least $N_{OQ}$ ROBs exist per output port. Note that packets scheduled for fetching by the fetch scheduler 104 are not yet committed to the wire, as the packet may yet be selected for dropping in posterior stages within the egress sub-system 100.

Packets processed by egress subsystem 100 are assigned a packet identifier (pktid) which identifies the packet while it is inside the switch, and all outstanding packets have a unique pktid. After a packet is egressed, its pktid may be reused. Packet identifier pktid can be used to notify when a packet transitions between states (e.g., waiting, in-flight, or transmitting). Based on the drop with pktid indications received from transmit (Tx) control 146, fetch scheduler 104 will track which of the outstanding packets have been dropped and which ones have been allowed to be transmitted (i.e., not dropped). An outstanding packet can be a packet whose header or body has started being fetched. Based on drop/non-drop indication, fetch scheduler 104 can decide in which order to fetch the bodies of the allowed (non-drop) outstanding packets according to a user configurable policy, while completely aborting the fetching for dropped packets thus saving fetch bandwidth. For example, an option would also be to fetch all the non-drop packet bodies in parallel at lower than egress-rate. Another option would be to fetch the non-drop packet bodies serially each at faster-than or equal-to-egress-rate.

Based on one or more of incast level for a port, egress-side packet drop rate for the port (due to E-ACL and other mechanisms), and switch fabric congestion status, fetch scheduler 104 can decide a rate to fetch one or multiple packets relative to egress port speed. Fetch scheduler 104 can keep track of one or more of: incast level for a port, egress-side packet drop rate for the port (due to E-ACL and other mechanisms) and switch fabric congestion status. For a low egress-side packet drop rate below a threshold level), fetch scheduler 104 can reduce packet latency by fetching packets from switch fabric 150 at faster than line rate and by configuring the output queues (OQs) (i.e., ROBs) to operate in virtual cut-through (VCT) mode.

For a high egress-side packet drop rate higher than a second threshold level, fetch scheduler 104 can fetch multiple packets simultaneously each at slower than line rate speed. In order to avoid packet under run, fetch scheduler 104 configures the output queues (OQs) (i.e., ROBs) participating in a slower than line rate speed multi-packet fetch scheme to operate in store-and-forward (SAF) mode. Fetch scheduler 104 may decide to cause SAF operation mode for a specific OQ and issue SAF mode force command to the OQ to force SAF operation mode for the OQ. Fetch scheduler 104 can issue fetch operations with pktid at a rate that corresponds to fetch rate.

Fetch scheduler 104 can receive a switch fabric congestion state signal from switch fabric 150 and fetch scheduler 104 can use the state signal to throttle or not throttle the fetch rate. In the absence of this type congestion state signal, fetch scheduler 104 can apply a bandwidth adaptation policy based on a static configuration such as indicating the duty cycle that fetch scheduler 104 is to comply with when utilizing different fractions of the available overspeed. For example, 100% overspeed can be used at most 20 cycles in a row and then 80 cycles no overspeed can be used, or 50% overspeed can be used 40 cycles in a row and then 60 cycles no overspeed can be used, and so forth.

In some examples, whether a size of a flow (in number of bytes) is larger or includes larger packets (e.g., TCP elephant flow) or smaller or includes smaller packets (e.g., TCP mouse flow) can influence a fetch rate of a packet payload. In some examples, a flow with a larger payload size (e.g., elephant flow) can have a higher allocated fetch rate than a flow with a smaller payload size (e.g., mouse flow).

Reorder buffer (ROB) allocator 106 manages the available space in $ROB_1$ to $ROB_{NOQ}$, each associated with an OQ, and decides a landing slot in a ROB for each fetched packet segment from switch fabric 150. ROB allocator 106 can encode an ID for a read request segment (flit) sent to fabric 150. The read request is shown as rreq and has a corresponding identifier, rreq-id.

ROB allocator 106 can issue signal OQ segment allocate to OQ state 108. Signal OQ segment allocate is used when ROB allocator 106 decides to allocate a specific ROB slot for a specific packet segment and notifies OQ state block 108.

OQ state block 108 keeps track of the used/free slots of each OQ's ROB. OQ state block 108 receives signal OQs segment credit return from the ROBs to update used/free slots of each OQ's ROB. ROBs provide OQs segment credit return every time a ROB releases a slot whereby the packet segment has been forwarded to the packet TX pipeline 140 or the packet segment has been dropped from the ROB, ROBs return a credit to OQ state block 108. OQ state block 108 uses these credit returns to keep track of the state of the OQ (i.e., which slots of the ROBs are used/free).

OQ state block 108 indicates the state of each OQ to ROB allocator block 106 through signal OQ segment credit count. OQ state block 108 notifies ROB allocator 106 of OQs segment credit count for $ROB_1$ to $ROB_{NOQ}$ to identify available space in $ROB_1$ to $ROB_{NOQ}$. ROB allocator block 106 uses this state to perform allocations of the next fetched packet segments. ROB allocator 106 can only issue new rreq flits and rreq-id) to switch fabric 150 if there is an available ROB slot for it (i.e. only if there is an available credit, which will be consumed by this rreq). The lack of credits forces a throttling on the fetching rate. Fetching rate (assuming no lack of credits) is controlled by fetch scheduler 104 based on an adaptive bandwidth overspeed allocation policy, which depends on all the state fetch scheduler 104 has available to it. Adaptive bandwidth overspeed can be based on level of incast for the port, egress-side packet drop rate for the port, and so forth.

OQ state block 108 provides OQ state signal to fetch scheduler 104 to indicate a state of each $ROB_1$ to $ROB_{NOQ}$. For example, OQ state signal can inform fetch scheduler 104 if an OQ is full or not. Fetch scheduler 104 should not schedule a new packet to be fetched for a full OQ.

Description refers next to examples of Packet Data Output Queueing 120. RRSP-ID OQ decoder 122 is to receive responses (rrsp and rrsp-id) from switch fabric 150 and determine a ROB associated with the rrsp and rrsp-id to which to allocate a packet segment.

A ROB can receive packet segments out-of-order because of unpredictable latencies in switch fabric 150. A ROB can reorder packet segments based on the landing slot encoded in the ID for the read response flit received from fabric 150. A response flit is shown as rrsp and its ID is shown as rrsp-id.

In some embodiments, there are two separate ROBs, namely, a packet header-ROB (H-ROB) and a packet body-ROB (B-ROB). Header reorder buffer (H-ROB) can be a buffer for receiving segments of a packet corresponding to its header. H-ROB can be used to reorder header segments of a packet for transmission in correct order prior to transmission. Body reorder buffer (B-ROB) can be a buffer for receiving segments of a packet corresponding to its body. B-ROB can be used to reorder packet body segments for transmission in correct order. The ROBs can be implemented using a cache, memory, persistent memory, or storage.

A ROB can be configured to operate in either VCT or SAF mode. As described earlier, fetch scheduler 104 issues a SAF mode force signal to override the current configuration of the OQ and force SAF mode. This is used to prevent packet underrun when fetching one or more packets at lower-than egress rate. In some embodiments, a ROB operates in virtual cut-through (VCT)-mode when the configured jitter threshold (JT) (described later) is smaller than the MTU for the port.

When an OQ is forced to operate in SAF mode, then the OQ must be able to store, at least, a full MTU.

A jitter threshold (JT) check can be applied to ROBs to provide a jitter threshold enforcing system to B-ROB (body reorder buffer) to enforce a number of head-of-packet segments that must be buffered in the B-ROB to allow such packet to begin egress, in order to cover for a fabric's target maximum latency or fabric's target maximum jitter. A fabric's target maximum latency or fabric's target maximum jitter can refer to outlier latencies suffered by mid-packet or packet tail segments after the packet started egressing (to prevent underrun up to a target probability). JT check can enforce buffering based on one or more of: (1) head-of-packet segments received exceeding a threshold and/or (2) based on timers (e.g., JT is met at expiration of a timer that starts at a time of issuance of a first read request for first segment of a packet (e.g., header)).

If a packet header has fully arrived in an H-ROB, processing can commence on the packet header using header processing 144 to determine whether to complete or discontinue fetching of the packet's body. An H-ROB can allow transmit ready headers to be pulled ahead-of-time from H-ROB for early header processing before the JT is complied with for associated packet body segments in a B-ROB.

After a packet is dropped, fetch scheduler 104 fetches one or more next packets with overspeed when possible. Overspeed in the OQ (ROB) deallocation can be used as well. Waiting for in-flight requests to land in a ROB before deallocating the ROB entries could cause temporary blocking of packet egress. To resolve this, the following could be used. A Request-ID Translation Table (Expansion) on Request Path translates an internal request-ID (encoding directly or indirectly the destination OQ, ROB reordering data, and packet-id) belonging to a "smaller code-space", into an external request-ID for switch fabric 150 belonging to a "larger code-space". This allows multiple in-flight requests reusing the same internal request-ID being mapped to distinct external request-ID.

A Response-ID Barrier on the Response Path can be used such that when a packet is dropped due to ACL, all the in-flight requests for the packet are marked for dropping upon arrival on this barrier. These are marked based on the external response-ID. This allows the corresponding internal request-ID (response-ID) to be immediately reusable (thus ROB space immediately reclaimed). A Response-ID Translation Table (Compaction) on Response Path can be used so that after the external response-ID has passed the barrier, it is translated back to the internal response-ID (smaller code-space), and steered into the correct ROB entry.

Description next turns to Packet TX pipeline 140. Egress scheduler 142 schedules fully arrived headers (e.g., fully arrived at H-ROBs) for header processing by the header processing block 144, and also schedules non-drop packets for egress as atomic units, i.e., it does not schedule egress of packet headers independently of packet bodies. This is in contrast to fetch scheduler 104, which could fetch headers and bodies at different times. The conditions that need to be met for egress scheduler 142 to schedule a non-drop packet for egress depend on the mode of operation of the ROB (SAF or VCT). For SAF mode, the full packet is to be stored in the ROB prior to egress. For VCT, a jitter threshold check (described earlier) can be used. Egress scheduler receives a drop or non-drop indication, for each packet processed by the header processing block 144, either directly from the header processing block 144 or from the Tx control block 146.

Egress scheduler 142 receives flow control pause indications for the associated output port from the Tx control block 146, when a flow control pause comes to effect. In reaction to a flow control pause indication, the egress scheduler 142 provides a stall indication to the affected ROBs, i.e., the ROBs associated with flow control pause. A ROB is stalled when no segments of new packets can be pulled-out of such ROB. Stall is based on flow control received at an output port associated with the egress subsystem 100.

Header processing block 144 can perform one or more of: egress-access control list (E-ACL) checking, encapsulation, de-encapsulation, in-band telemetry data insertion, packet lifetime limit checking, and so forth. Header processing block 144 will decide to drop the packet or to allow its transmission. When header processing block 144 decides to drop a packet, a drop indication and its associated pktid metadata are sent to the Tx control block 146, the fetch scheduler 104 the egress scheduler 142, and the corresponding ROB (i.e. the ROB holding the packet to be dropped). The ROB, upon receiving the drop indication, drops the already stored packet segments from inside the ROB, and also drops the still in-transit segments for such a packet as soon as those segments arrive (i.e. the rrsp arrives).

In some examples, a group of packets can have the same header sections that are used to determine whether to drop or egress a packet. Accordingly, header processing block 144 processes a first header in a group of packets and determines whether to drop or egress an entire group of packets. A header can include a group indicator that indicates if a packet is part of a group of packets. If the packet is part of a group of packets and a header in the group has been processed and a determination made that the packet is to be egressed or dropped, all packets in the group can be treated the same. Accordingly, header processing can be reduced for groups of multiple packets that are all to be egressed or dropped. For example, use of a transmission control protocol (TCP) can allow a TCP window to be sent whereby a group of multiple packets in sequence are sent as a group. Packet header processing can be performed once for a header in a group (e.g., a first received header).

Transmit (Tx) control block 146 receives or pulls packet body segments and header segments from a ROB that stores a body associated with a header that was modified and approved for egress (i.e. non-drop) by the header processing block 144. In the event of a drop indication, Tx control 146 provides a drop indication, with a pktid metadata, to fetch scheduler 104 and to the egress scheduler 142. The egress scheduler 142 marks the packets to be dropped as non-eligible for egress scheduling and forwards the drop indication and pktid metadata to the ROBs, so ROBs know the packet was decided to be dropped. The fetch scheduler 104 uses the pktid metadata and drop indication to keep track of drop rates, and to avoid fetching the reminder of the packet for a dropped packet. Tx control 146 can process flow control and cause stall signals to be issued (described earlier).

Figure 3:
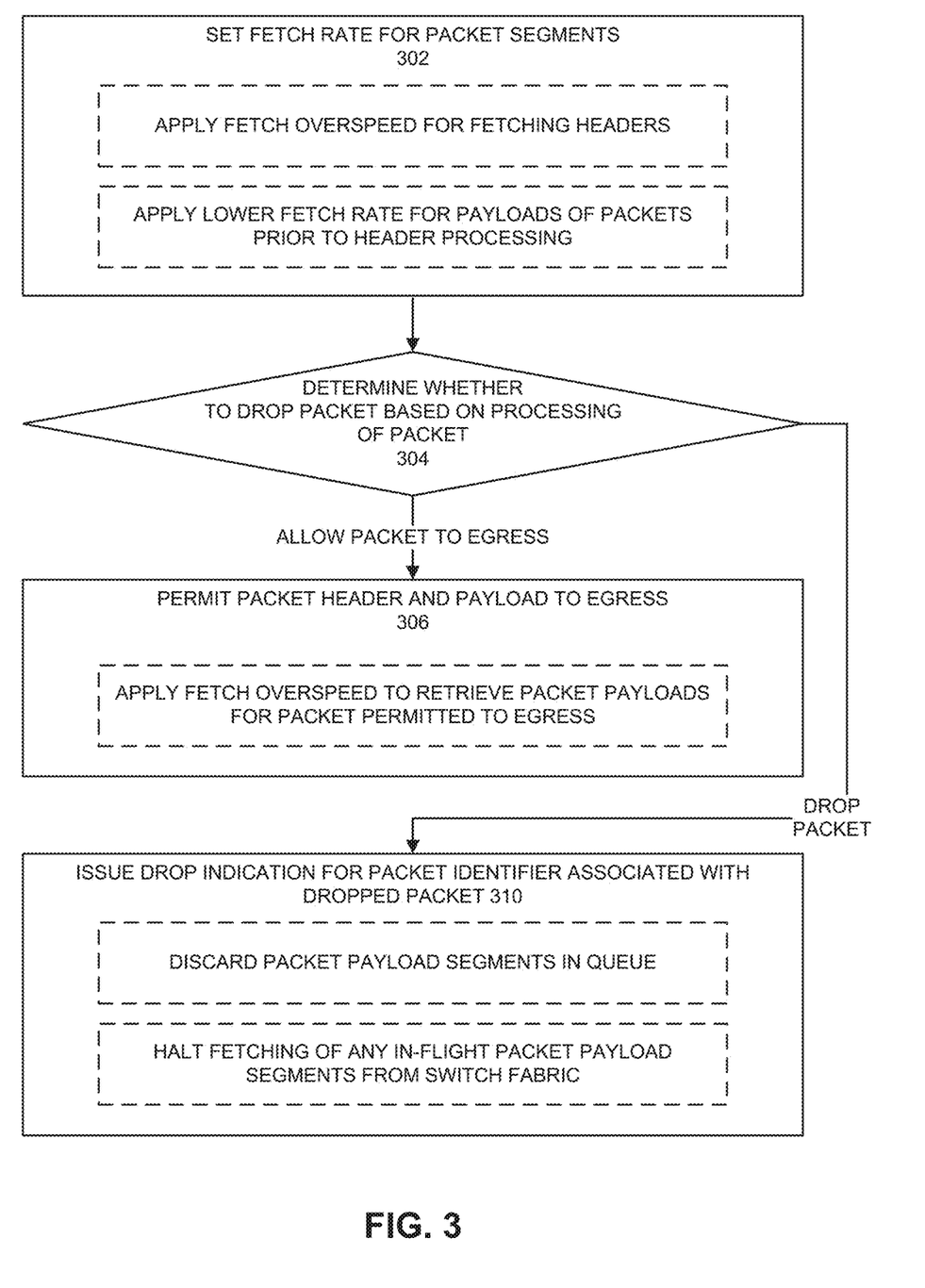
FIG. 3 depicts a suitable process.

FIG. 3 depicts a suitable process. The process can be performed by an egress subsystem at least to control a rate at which packet segments are fetched from a switch. At 302, a fetch rate retrieve to one or more segments of one or more packets from a switch fabric is configured. The fetch rate can be set based on one or more of: a drop indication, drop rate, incast level, operation of queues (or reorder buffers) in SAF or VCT mode, or fabric congestion level. Fetching of packet segments can be in response to receipt of packet pointers to packet segments stored in a switch fabric.

Various embodiments attempt to use fetch bandwidth to avoid gaps between egressed packets but conserve fetch bandwidth for use by other ports where needed. The following provides examples of manners of configuring fetch rate. For example, retrieval packet headers can involve use of overspeed to fetch header segments of a packet at greater than egress line rate. Multiple headers can be ready for analysis, which can minimize the bandwidth wasted in fetching bodies for packets that will be dropped. For example, retrieval of payload segments can occur at a less than line rate and include use of time division multiplexing (TDM) of requests for payload segments. Where a queue for packets is configured to permit egress of packets in store-and-forward (SAF) mode, multiple packets can be fetched using TDM at lower than egress port speed. Where a queue for packets is configured to permit egress of packets in virtual cut through (VCT) mode, packets can be fetched at egress port speed. In a case where incast exists at a target egress port from which packet(s) will be egressed and an E-ACL, drop rate is relatively high, packet header and/or body segments can be retrieved from the switch at greater than egress line rate. In a case where there is no incast, or there is incast but the currently drop rate is low, requests for packet segments can be made at lower than line rate as the risk of "bubbles" is relatively low.

At 304, a packet header is processed to determine if the packet is to be dropped and not permitted to egress. For example, processing of a header can involve use of E-ACL to inspect the header and determine if the packet should be dropped. If the packet is to be dropped, then 310 follows. If the packet is not to be dropped, 306 follows.

At 306, if processing packet header indicates packet is to egress, retrieve packet body segments of packet from a queue to egress. If a packet body for the packet permitted to egress is not stored in a queue, the packet body can be fetched from a switch fabric using overspeed. In a scenario where a header is processed and the corresponding packet is determined to be egressable from an egress port, retrieval of packet body segments of packet from a switch fabric to egress can occur using overspeed.

At 310, a drop indication signal can be issued which causes the fetch scheduler to stop fetching body segments associated with the dropped packet. The packet payload segments in a queue associated with the dropped packet are discarded. Any in-flight requests for packet payload segments can be halted and any payload segments available for storage in a queue can be discarded. Where responses from the switch fabric are dropped before they are admitted to the queue, the entries associated with the dropped packet header and/or body) are free as soon as the drop indication is received. In addition, fetch bandwidth originally allocated to the dropped packet can be re-allocated, to one or multiple of the non-dropped packets that are simultaneously being fetched.

Figure 4:
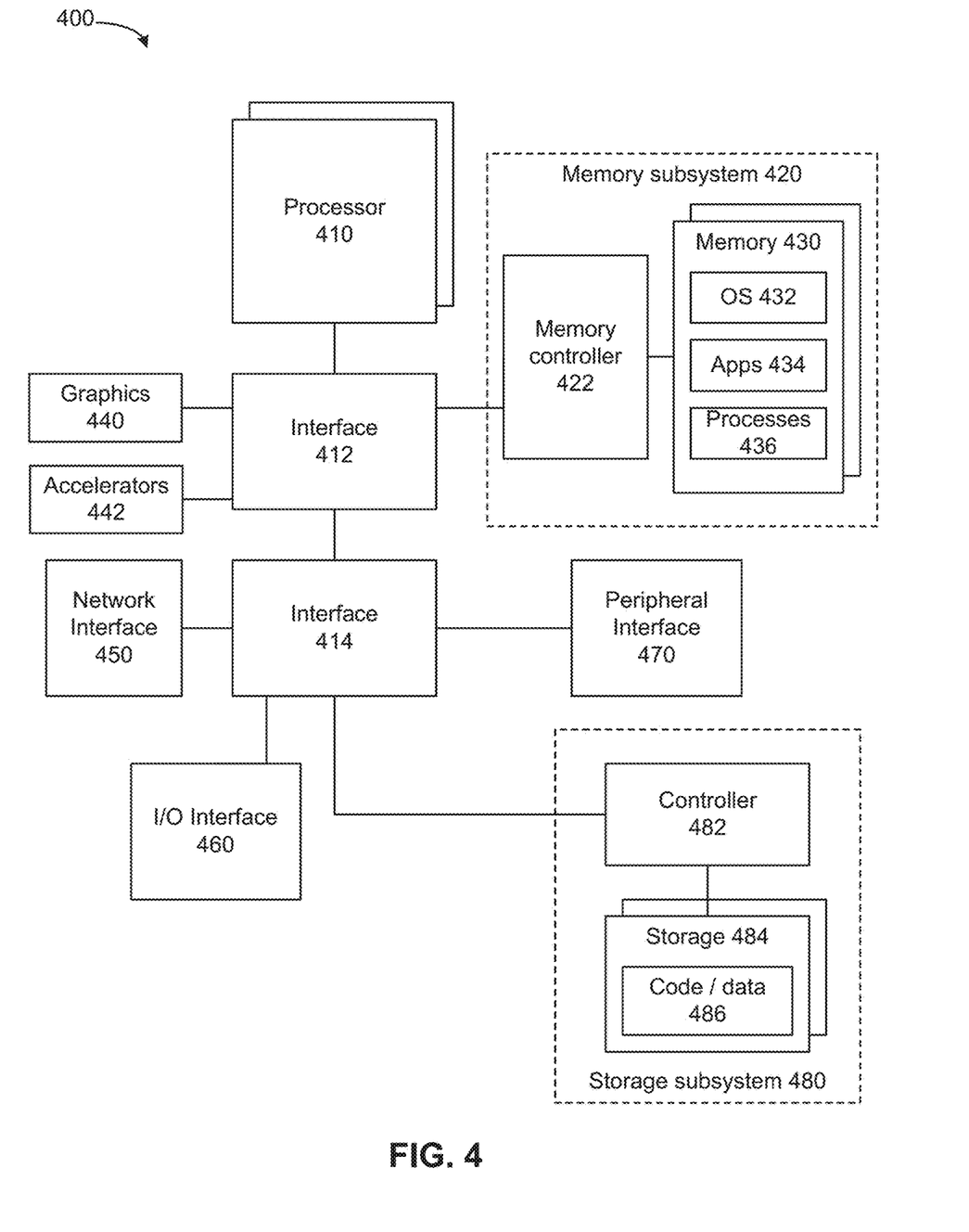
FIG. 4 depicts a system.

FIG. 4 depicts a system. The system can use embodiments described herein to provide data to or from the system to another device through a mesh or fabric. System 400 includes processor 410, which provides processing, operation management, and execution of instructions for system 400. Processor 410 can include any type of microprocessor, central processing unit (CPU), graphics processing unit (GPU), processing core, or other processing hardware to provide processing for system 400, or a combination of processors. Processor 410 controls the overall operation of system 400, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

In one example, system 400 includes interface 412 coupled to processor 410, which can represent a higher speed interface or a high throughput interface for system components that needs higher bandwidth connections, such as memory subsystem 420 or graphics interface components 440, or accelerators 442. Interface 412 represents an interface circuit, which can be a standalone component or integrated onto a processor die. Where present, graphics interface 440 interfaces to graphics components for providing a visual display to a user of system 400. In one example, graphics interface 440 can drive a high definition (HD) display that provides an output to a user. High definition can refer to a display having a pixel density of approximately 100 PPI (pixels per inch) or greater and can include formats such as full HD (e.g., 1080p), retina displays, 4K (ultra-high definition or UHD), or others. In one example, the display can include a touchscreen display. In one example, graphics interface 440 generates a display based on data stored in memory 430 or based on operations executed by processor 410 or both. In one example, graphics interface 440 generates a display based on data stored in memory 430 or based on operations executed by processor 410 or both.

Accelerators 442 can be a fixed function offload engine that can be accessed or used by a processor 410. For example, an accelerator among accelerators 442 can provide compression (DC) capability, cryptography services such as public key encryption (PKE), cipher, hash/authentication capabilities, decryption, or other capabilities or services. In some embodiments, in addition or alternatively, an accelerator among accelerators 442 provides field select controller capabilities as described herein. In some cases, accelerators 442 can be integrated into a CPU socket (e.g., a connector to a motherboard or circuit board that includes a CPU and provides an electrical interface with the CPU). For example, accelerators 442 can include a single or multi-core processor, graphics processing unit, logical execution unit single or multi-level cache, functional units usable to independently execute programs or threads, application specific integrated circuits (ASICs), neural network processors (NNPs), programmable control logic, and programmable processing elements such as field programmable gate arrays (FPGAs). Accelerators 442 can provide multiple neural networks, CPUs, processor cores, general purpose graphics processing units, or graphics processing units can be made available for use by artificial intelligence (AI) or machine learning (ML) models. For example, the AI model can use or include any or a combination of: a reinforcement learning scheme, Q-learning scheme, deep-Q learning, or Asynchronous Advantage Actor-Critic (A3C), combinatorial neural network, recurrent combinatorial neural network, or other AI or ML model. Multiple neural networks, processor cores, or graphics processing units can be made available for use by AI or ML models.

Memory subsystem 420 represents the main memory of system 400 and provides storage for code to be executed by processor 410, or data values to be used in executing a routine. Memory subsystem 420 can include one or more memory devices 430 such as read-only memory (ROM), flash memory, one or more varieties of random access memory (RAM) such as DRAM, or other memory devices, or a combination of such devices. Memory 430 stores and hosts, among other things, operating system (OS) 432 to provide a software platform for execution of instructions in system 400. Additionally, applications 434 can execute on the software platform of OS 432 from memory 430. Applications 434 represent programs that have their own operational logic to perform execution of one or more functions. Processes 436 represent agents or routines that provide auxiliary functions to OS 432 or one or more applications 434 or a combination. OS 432, applications 434, and processes 436 provide software logic to provide functions for system 400. In one example, memory subsystem 420 includes memory controller 422, which is a memory controller to generate and issue commands to memory 430. It will be understood that memory controller 422 could be a physical part of processor 410 or a physical part of interface 412. For example, memory controller 422 can be an integrated memory controller, integrated onto a circuit with processor 410.

While not specifically illustrated, it will be understood that system 400 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a Peripheral Component Interconnect Express (PCIe) bus, a Hyper Transport or industry standard architecture (ISA) bus, a small computer system interface (SCSI) bus, a universal serial bus (USB), or an Institute of Electrical and Electronics Engineers (IEEE) standard 1394 bus (Firewire).

In one example, system 400 includes interface 414, which can be coupled to interface 412. In one example, interface 414 represents an interface circuit, which can include stand-alone components and integrated circuitry. In one example, multiple user interface components or peripheral components, or both, couple to interface 414. Network interface 450 provides system 400 the ability to communicate with remote devices (e.g., servers or other computing devices) over one or more networks. Network interface 450 can include an Ethernet adapter, wireless interconnection components, cellular network interconnection components, USB (universal serial bus), or other wired or wireless standards-based or proprietary interfaces. Network interface 450 can transmit data to a device that is in the same data center or rack or a remote device, which can include sending data stored in memory. Network interface 450 can receive data from a remote device, which can include storing received data into memory. Various embodiments can be used in connection with network interface 450, processor 410, and memory subsystem 420.

In one example, system 400 includes one or more input/output (I/O) interface(s) 460. I/O interface 460 can include one or more interface components through which a user interacts with system 400 (e.g., audio, alphanumeric, tactile/touch, or other interfacing). Peripheral interface 470 can include any hardware interface not specifically mentioned above. Peripherals refer generally to devices that connect dependently to system 400. A dependent connection is one where system 400 provides the software platform or hardware platform or both on which operation executes, and with which a user interacts.

In one example, system 400 includes storage subsystem 480 to store data in a nonvolatile manner. In one example, in certain system implementations, at least certain components of storage 480 can overlap with components of memory subsystem 420. Storage subsystem 480 includes storage device(s) 484, which can be or include any conventional medium for storing large amounts of data in a nonvolatile manner, such as one or more magnetic, solid state, or optical based disks, or a combination. Storage 484 holds code or instructions and data 486 in a persistent state (i.e., the value is retained despite interruption of power to system 400). Storage 484 can be generically considered to be a "memory," although memory 430 is typically the executing or operating memory to provide instructions to processor 410. Whereas storage 484 is nonvolatile, memory 430 can include volatile memory (i.e., the value or state of the data is indeterminate if power is interrupted to system 400). In some examples, storage subsystem 480 includes controller 482 to interface with storage 484. In some examples, controller 482 is a physical part of interface 414 or processor 410 or can include circuits or logic in both processor 410 and interface 414.

A volatile memory is memory whose state (and therefore the data stored in it) is indeterminate if power is interrupted to the device. Dynamic volatile memory requires refreshing the data stored in the device to maintain state. One example of dynamic volatile memory includes DRAM (Dynamic Random Access Memory), or some variant such as Synchronous DRAM (SDRAM). A memory subsystem as described herein may be compatible with a number of memory technologies, such as DDR3 (Double Data Rate version 3, original release by JEDEC (Joint Electronic Device Engineering Council) on Jun. 27, 2007). DDR4 (DDR version 4, initial specification published in September 2012 by JEDEC), DDR4E (DDR version 4), LPDDR3 (Low Power DDR version 3, JESD209-3B, August 2013 by JEDEC), LPDDR4) LPDDR version 4, JESD209-4, originally published by JEDEC in August 2014), WIO2 (Wide Input/output version 2, JESD229-2 originally published by JEDEC in August 2014, HBM (High Bandwidth Memory, JESD325, originally published by JEDEC in October 2013, LPDDR5 (currently in discussion by JEDEC), HBM2 (HBM version 2), currently in discussion by JEDEC, or others or combinations of memory technologies, and technologies based on derivatives or extensions of such specifications. The JEDEC standards are available at www.jedec.org.

A non-volatile memory (NVM) device is a memory whose state is determinate even if power is interrupted to the device. In one embodiment, the NVM device can comprise a block addressable memory device, such as NAND technologies, or more specifically, multi-threshold level NAND flash memory (for example, Single-Level Cell ("SLC"), Multi-Level Cell ("MLC"), Quad-Level Cell ("QLC"), Tri-Level Cell ("TLC"), or some other NAND). A NVM device can also comprise a byte-addressable write-in-place three dimensional cross point memory device, or other byte addressable NVM device (also referred to as persistent memory), such as single or multi-level Phase Change Memory (PCM) or phase change memory with a switch (PCMS), NVM devices that use chalcogenide phase change material (for example, chalcogenide glass), resistive memory including metal oxide base, oxygen vacancy base and Conductive Bridge Random Access Memory (CB-RAM), nanowire memory, ferroelectric random access memory (FeRAM, FRAM), magneto resistive random access memory (MRAM) that incorporates memristor technology, spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

A power source (not depicted) provides power to the components of system 400. More specifically, power source typically interfaces to one or multiple power supplies in system 400 to provide power to the components of system 400. In one example, the power supply includes an AC to DC (alternating current to direct current) adapter to plug into a wall outlet. Such AC power can be renewable energy (e.g., solar power) power source. In one example, power source includes a DC power source, such as an external AC to DC converter. In one example, power source or power supply includes wireless charging hardware to charge via proximity to a charging field. In one example, power source can include an internal battery, alternating current supply, motion-based power supply, solar power supply, or fuel cell source.

In an example, system 400 can be implemented using interconnected compute sleds of processors, memories, storages, network interfaces, and other components. High speed interconnects can be used such as PCIe, Ethernet, or optical interconnects (or a combination thereof).

Embodiments herein may be implemented in various types of computing and networking equipment, such as switches, routers, racks, and blade servers such as those employed in a data center and/or server farm environment. The servers used in data centers and server farms comprise arrayed server configurations such as rack-based servers or blade servers. These servers are interconnected in communication via various network provisions, such as partitioning sets of servers into Local Area Networks (LANs) with appropriate switching and routing facilities between the LANs to form a private Intranet. For example, cloud hosting facilities may typically employ large data centers with a multitude of servers. A blade comprises a separate computing platform that is configured to perform server-type functions, that is, a "server on a card." Accordingly, each blade includes components common to conventional servers, including a main printed circuit board (main board) providing internal wiring (i.e., buses) for coupling appropriate integrated circuits (ICs) and other components mounted to the board.

Figure 5:
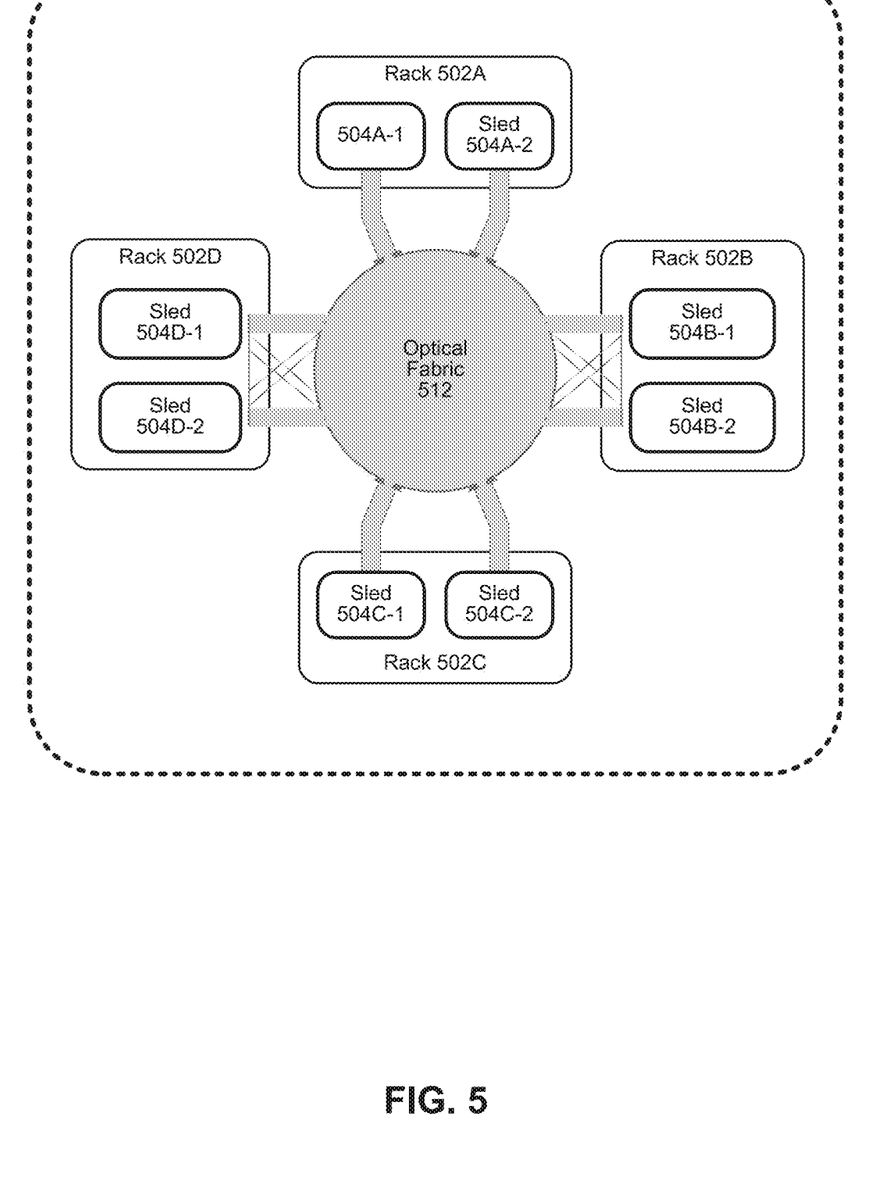
FIG. 5 depicts an example of a data center.

FIG. 5 depicts an example of a data center. Various embodiments of a data center can use embodiments described herein at least to control fetching and egress of packets. As shown in FIG. 5, data center 500 may include an optical fabric 512. Various embodiments can be used in fabric 512. Optical fabric 512 may generally include a combination of optical signaling media (such as optical cabling) and optical switching infrastructure via which any particular sled in data center 500 can send signals to (and receive signals from) the other sleds in data center 500. The signaling connectivity that optical fabric 512 provides to any given sled may include connectivity both to other sleds in a same rack and sleds in other racks. Data center 500 includes four racks 502A to 502D and racks 502A to 502D house respective pairs of sleds 504A-1 and 504A-2, 504B-1 and 504B-2, 504C-1 and 504C-2, and 504D-1 and 504D-2. Thus, in this example, data center 500 includes a total of eight sleds. Optical fabric 512 can provide sled signaling connectivity with one or more of the seven other sleds. For example, via optical fabric 512, sled 504A-1 in rack 502A may possess signaling connectivity with sled 504A-2 in rack 502A, as well as the six other sleds 504B-1, 504B-2, 504C-1, 504C-2, 504D-1, and 504D-2 that are distributed among the other racks 502B, 502C, and 502D of data center 500. The embodiments are not limited to this example. For example, fabric 512 can provide optical and/or electrical signaling.

Figure 6:
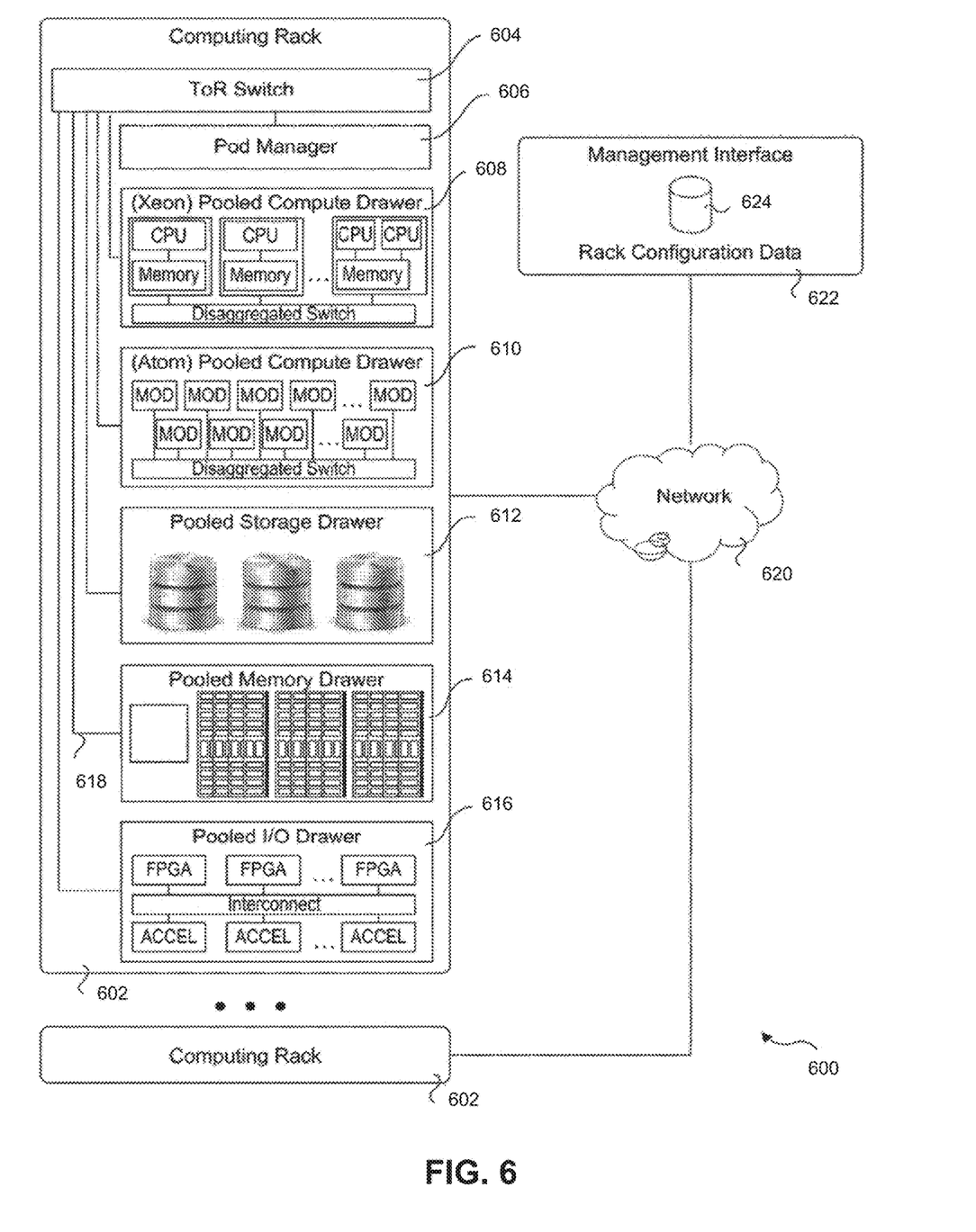
FIG. 6 depicts an environment.

FIG. 6 depicts an environment 600 includes multiple computing racks 602, each including a Top of Rack (ToR) switch 604, a pod manager 606, and a plurality of pooled system drawers. Various embodiments can be used in a switch. Generally, the pooled system drawers may include pooled compute drawers and pooled storage drawers. Optionally, the pooled system drawers may also include pooled memory drawers and pooled Input/Output (I/O) drawers. In the illustrated embodiment the pooled system drawers include an INTEL® XEON® pooled computer drawer 608, and INTEL® ATOM™ pooled compute drawer 610, a pooled storage drawer 612, a pooled memory drawer 614, and a pooled I/O drawer 616. Each of the pooled system drawers is connected to ToR switch 604 via a high-speed link 618, such as a 40 Gigabit/second (Gb/s) or 100 Gb/s Ethernet link or a 100+ Gb/s Silicon Photonics (SiPh) optical link. In one embodiment high-speed link 618 comprises a 400 Gb/s SiPh optical link.

Multiple of the computing racks 600 may be interconnected via their ToR switches 604 (e.g., to a pod-level switch or data center switch), as illustrated by connections to a network 620. In some embodiments, groups of computing racks 602 are managed as separate pods via pod manager(s) 606. In one embodiment, a single pod manager is used to manage all of the racks in the pod. Alternatively, distributed pod managers may be used for pod management operations.

Environment 600 further includes a management interface 622 that is used to manage various aspects of the environment. This includes managing rack configuration, with corresponding parameters stored as rack configuration data 624.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software module, routines, subroutines, functions, methods, procedures, software interfaces, APIs, instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation. It is noted that hardware, firmware and/or software elements may be collectively or individually referred to herein as "module," "logic," "circuit," or "circuitry." A processor can be one or more combination of a hardware state machine, digital control logic, central processing unit, or any hardware, firmware and/or software elements.

Some examples may be implemented using or as an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writable or re-writable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

The appearances of the phrase "one example" or "an example" are not necessarily all referring to the same example or embodiment. Any aspect described herein can be combined with any other aspect or similar aspect described herein, regardless of whether the aspects are described with respect to the same figure or element. Division, omission or inclusion of block functions depicted in the accompanying figures does not infer that the hardware components, circuits, software and/or elements for implementing these functions would necessarily be divided, omitted, or included in embodiments.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The terms "first," "second," and the like, herein do not denote any order, quantity, or importance, but rather are used to distinguish one element from another. The terms "a" and "an" herein do not denote a limitation of quantity, but rather denote the presence of at least one of the referenced items. The term "asserted" used herein with reference to a signal denote a state of the signal, in which the signal is active, and which can be achieved by applying any logic level either logic 0 or logic 1 to the signal. The terms "follow" or "after" can refer to immediately following or following after some other event or events. Other sequences of operations may also be performed according to alternative embodiments. Furthermore, additional operations may be added or removed depending on the particular applications. Any combination of changes can be used and one of ordinary skill in the art with the benefit of this disclosure would understand the many variations, modifications, and alternative embodiments thereof.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z."

Illustrative examples of the devices, systems, and methods disclosed herein are provided below. An embodiment of the devices, systems, and methods may include any one or more, and any combination of, the examples described below.

Example 1 includes an egress apparatus comprising: a body buffer to store body segments associated with a packet; a header buffer to store header segments associated with the packet; and a header processor to process a header to determine whether to drop a packet associated with the header and based on a determination to drop the packet, the header processor is to provide an indication that the packet associated with the header is to be dropped, wherein the indication of packet drop is to cause termination of fetching of at least one body segment associated with the packet to be dropped or discard of at least one body segment associated with the packet to be dropped.

Example 2 includes any example and includes a fetch scheduler to stop fetching body segments associated with the packet to be dropped based on receipt of the indication.

Example 3 includes any example, wherein the body buffer is to not admit any body segment associated with the packet to be dropped based on receipt of the indication and to allow any entry in the body buffer to be used for another packet.

Example 4 includes any example and includes a fetch scheduler, wherein in response to the indication, the fetch scheduler to re-allocate fetch bandwidth originally allocated to the dropped packet to one or more non-dropped packets that are being fetched.

Example 5 includes any example and includes a fetch scheduler, wherein the fetch scheduler is to apply fetch overspeed to attempt to fill-up the body buffer using requests for body segments of another packet and wherein the body segments of another packet are available for egress in response to the indication.

Example 6 includes any example and includes a fetch scheduler to fetch a batch of header segments for different packets and apply time division multiplexing to fetch body segments associated with the header segments, wherein based on the header processor indicating a drop of any packet, the fetch scheduler is to terminate fetching of any body segments associated with the dropped packet.

Example 7 includes any example and includes a fetch scheduler and wherein based on a determination by the header processor to not drop the header, the fetch scheduler is to apply over-speed and fetch multiple packet body segments associated with the header in parallel.

Example 8 includes any example, wherein the fetch scheduler allocates over-speed amounts for sharing across egress ports within a port group.

Example 9 includes any example, wherein egress packet gaps remain steady or decrease in an event at least of increasing occurrences of packet drops or an amount of store-and-forward packets which are egressed are higher after access control list (ACL) drops occur.

Example 10 includes any example and includes a switch fabric coupled to the body buffer and the header buffer.

Example 11 includes any example and includes at least one of a server, rack, blade, or data center.

Example 12 includes a method performed by a packet egress system, the method comprising: requesting packet header segments of a packet at a higher rate than a rate for requesting body segments associated with the packet; processing a packet header to determine if the packet header is to be dropped; and based on the packet header being determined to be dropped: halting any in-process packet body segment requests and freeing any slot allocated in a queue for a body segment associated with the packet header that is to be dropped.

Example 13 includes any example, wherein based on the packet header being determined to not be dropped: applying overspeed to fetch packet body segments associated with the header.

Example 14 includes any example and includes based on the packet header being determined to be dropped: re-allocating fetch bandwidth originally allocated to a packet associated with the dropped header to one or more non-dropped packets that are being fetched.

Example 15 includes any example and includes fetching a group of header segments for different packets; applying time division multiplexing to fetch body segments associated with the group of header segments for different packets; and determining whether to drop any of the headers associated with the fetched header segments, wherein based on determining to drop a header in the group, terminating fetching of any body segments associated with the dropped header in the group.

Example 16 includes any example and includes queueing body segments fetched using time division multiplexing and applying store and forward (SAF) mode for egress of a packet with body segments fetched using time division multiplexing.

Example 17 includes any example and includes fetching body segments associated with the group of header segments for different packets at less than line rate.

Example 18 includes a system that includes a switch fabric to receive packets, the switch fabric comprising a memory; an egress sub-system to receive packet pointers associated with packets received by the switch fabric, wherein the egress sub-system is to: issue a fetch request for a packet header at higher than egress line rate; issue at least one fetch request for packet body segments at less than egress line rate; store a fetched header in a queue; store any received body segment in a queue; determine if a fetched header is to be dropped; and based on the fetched header being determined to be dropped: provide a drop indication, halt fetches of any packet body segments associated with the fetched header that is to be dropped, and free any queue space associated with any packet body segments associated with the fetched header that is to be dropped.

Example 19 includes any example, wherein the queue that stores any body segment is to operate in store and forward (SAF) mode and operate in virtual cut through (VCT) mode based on a determination the fetched header is not to be dropped.

Example 20 includes any example, wherein based on the fetched header being determined to be dropped, the egress sub-system is to stop fetching body segments associated with the packet to be dropped.

Example 21 includes any example, wherein based on the fetched header being determined to be dropped, the egress sub-system is to not admit any body segment associated with the packet to be dropped and to allow any entry in a queue that stores the dropped body segment to be used for another packet.

What is claimed is:

1. An egress apparatus comprising:
   a memory to store body segments associated with a packet;
   a second memory to store header segments associated with the packet; and
   a processor to process a header of the packet to determine whether to drop the packet and based on a determination to drop the packet, the processor is to: cause termination of fetching of at least one body segment associated with the packet to be dropped or the processor is to cause discard at least one body segment associated with the packet to be dropped, wherein the memory to store body segments associated with the packet that is to be dropped is to operate in store and forward (SAF) and
   based on a determination by the processor that the packet is not to be dropped, the memory to store body segments associated with the packet, determined not to be dropped, is to operate in cut through.

2. The apparatus of claim 1, comprising circuitry a to stop fetching body segments associated with the packet to be dropped based on receipt of an indication that the packet associated with the header is to be dropped.

3. The apparatus of claim 1, wherein the memory is to not admit a body segment associated with the packet to be dropped based on receipt of an indication that the packet associated with the header is to be dropped and to allow an entry in the memory to be used for another packet.

4. The apparatus of claim 1, comprising circuitry, wherein in response to an indication that the packet associated with the header is to be dropped, the circuitry is to re-allocate fetch bandwidth originally allocated to the dropped packet to one or more non-dropped packets that are being fetched.

5. The apparatus of claim 1, comprising circuitry, wherein the circuitry is to apply fetch overspeed to attempt to fill-up the memory using requests for body segments of another packet and wherein the body segments of another packet are available for egress in response to an indication that the packet associated with the header is to be dropped.

6. The apparatus of claim 1, comprising circuitry to fetch a batch of header segments for different packets and apply time division multiplexing to fetch body segments associated with the header segments, wherein based on the processor indicating a drop of a packet, the circuitry is to terminate fetching of body segments associated with the packet indicated to be dropped.

7. The apparatus of claim 1, comprising circuitry and wherein based on a determination by the processor to not drop the header, the circuitry is to apply over-speed and fetch multiple packet body segments associated with the header in parallel.

8. The apparatus of claim 1, comprising circuitry, wherein the circuitry is to allocate over-speed amounts for sharing across egress ports within a port group.

9. The apparatus of claim 1 wherein egress packet gaps remain steady or decrease in an event at least of increasing occurrences of packet drops or an amount of store-and-forward packets which are egressed are higher after access control list (ACL) drops occur.

10. The apparatus of claim 1, comprising a switch fabric coupled to the memory and the second memory.

11. The apparatus of claim 1, comprising at least one of a server, rack, blade, or data center and wherein the at least one of the server, rack, blade, or data center are coupled to the processor.

12. A method performed by a packet egress system, the method comprising:
requesting packet header segments of a packet at a higher rate than a rate for requesting body segments associated with the packet;
processing a packet header to determine if the packet header is to be dropped;
based on the packet header being determined to be dropped:
halting an in-process packet body segment requests,
freeing a slot allocated in a memory for a body segment associated with the packet header that is to be dropped, and
operating a memory that stores body segments associated with the packet header that is to be dropped in store and forward (SAF); and
based on the packet header being determined to not be dropped, the memory that stores body segments associated with the packet header is to operate in cut through.

13. The method of claim 12, wherein:
based on the packet header being determined to not be dropped: applying overspeed to fetch packet body segments associated with the header.

14. The method of claim 12, comprising:
based on the packet header being determined to be dropped:
re-allocating fetch bandwidth originally allocated to a packet associated with the dropped packet header to one or more non-dropped packets that are being fetched.

15. The method of claim 12, comprising:
fetching a group of header segments for different packets;
applying time division multiplexing to fetch body segments associated with the group of header segments for different packets; and
determining whether to drop at least one of the headers associated with the fetched header segments, wherein based on determining to drop a header in the group, terminating fetching of at least one body segment associated with the dropped header in the group.

16. The method of claim 15, comprising:
storing body segments fetched using time division multiplexing and
egressing a packet with body segments fetched using time division multiplexing.

17. The method of claim 15, comprising:
fetching body segments associated with the group of header segments for different packets at less than line rate.

18. A system comprising:
a switch fabric to receive packets, the switch fabric comprising a memory;
circuitry to receive packet pointers associated with packets received by the switch fabric, wherein the circuitry is to:
issue a fetch request for a packet header;
issue at least one fetch request for packet body segments;
store a fetched header in a memory;
store a received body segment in a memory;
determine if a fetched header is to be dropped; and
based on the fetched header being determined to be dropped:
halt fetches of packet body segments associated with the fetched header that is to be dropped,
free memory space associated with any packet body segments associated with the fetched header that is to be dropped, and
operate the memory that is to store body segments, associated with the fetched header determined to be dropped, in store and forward (SAF); and
based on the packet header determined not to be dropped, the memory that is to store body segments, associated with the fetched header, is to operate in cut through.

19. The system of claim 18, wherein based on the fetched header being determined to be dropped, the circuitry is to stop fetching body segments associated with a packet to be dropped.

20. The system of claim 18, wherein based on the fetched header being determined to be dropped, the circuitry is to not admit a body segment associated with the packet to be dropped and is to allow an entry in a memory that stores a dropped body segment to be used for another packet.

* * * * *